UNITED STATES PATENT OFFICE.

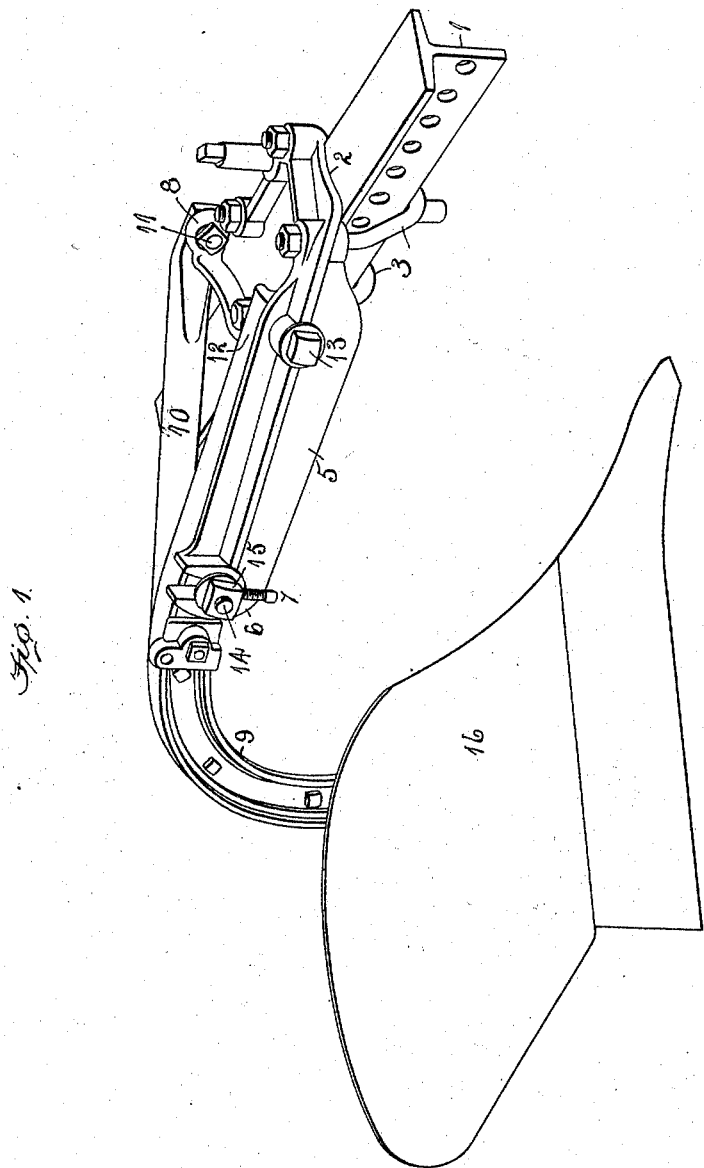

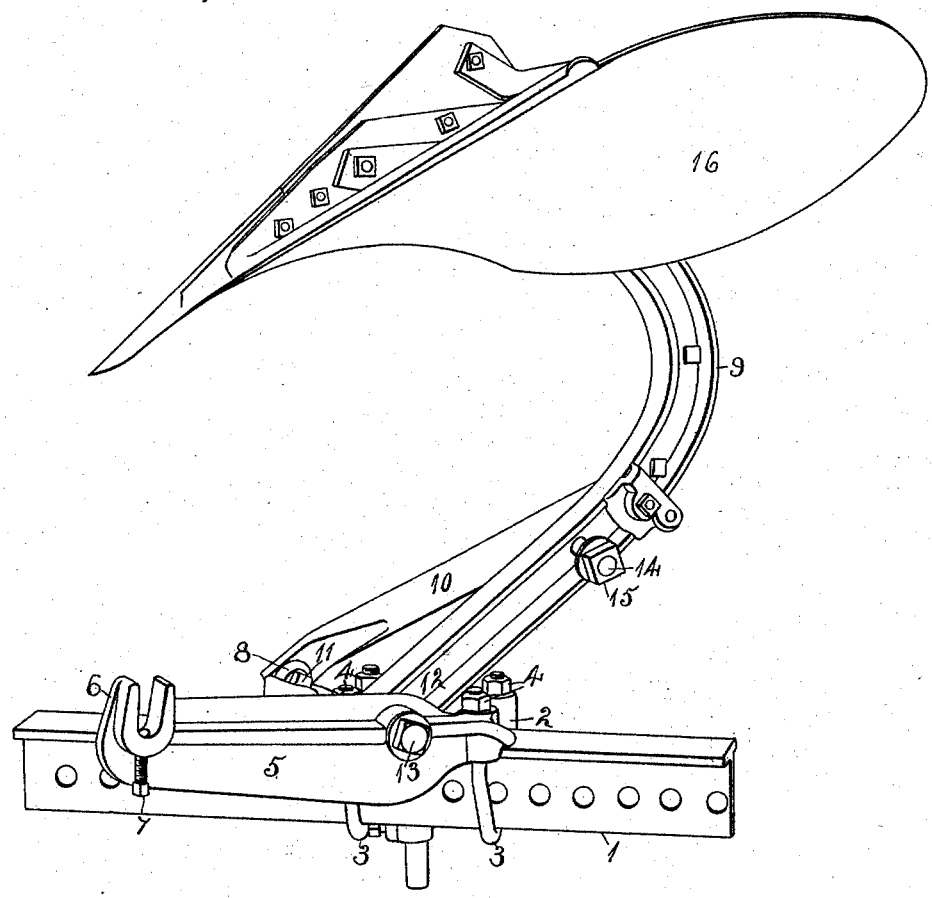

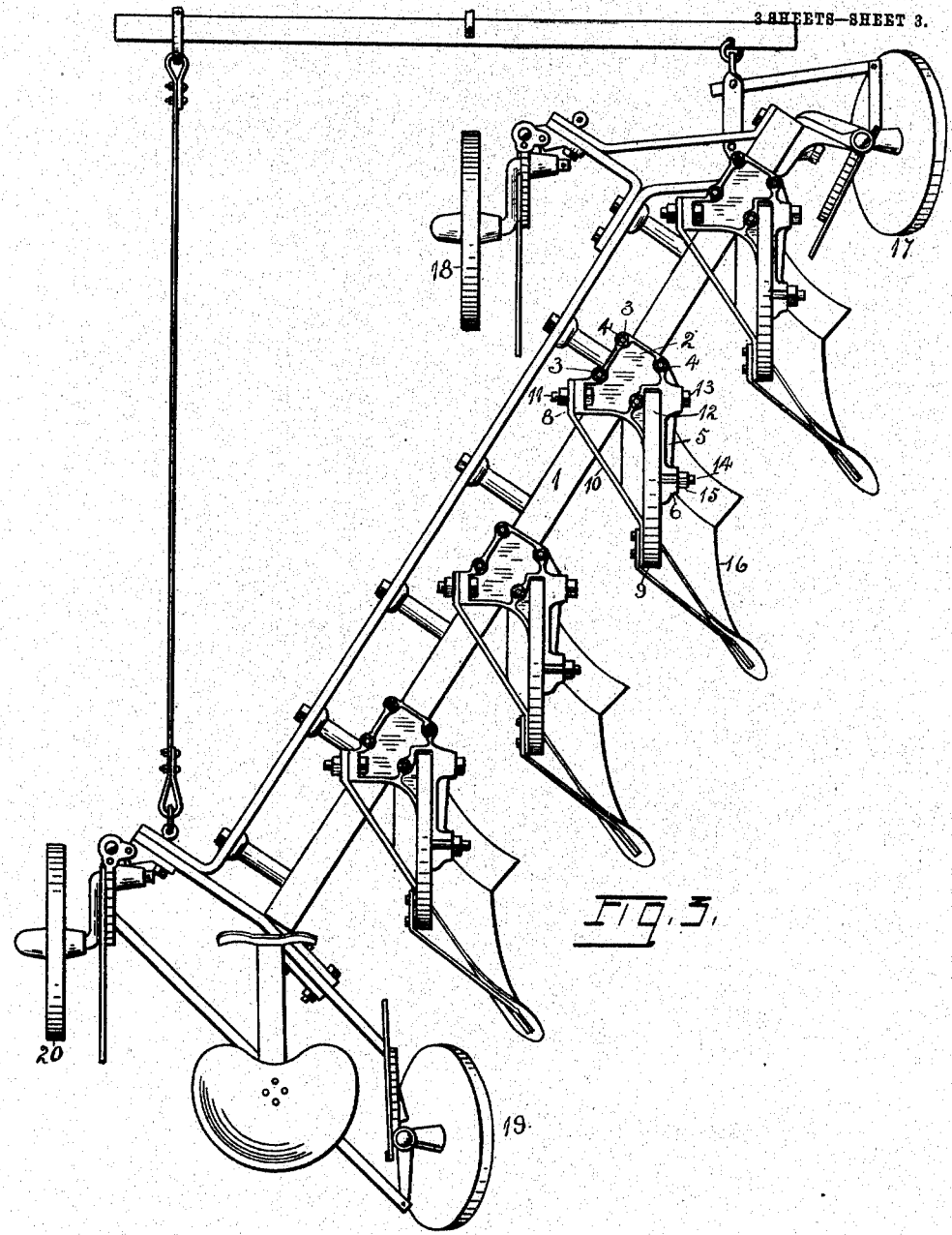

LEWIS E. WATERMAN, OF ROCKFORD, ILLINOIS, ASSIGNOR TO EMERSON-BRANTINGHAM CO., OF ROCKFORD, ILLINOIS, A CORPORATION OF ILLINOIS.

PLOW.

967,091.      Specification of Letters Patent.      Patented Aug. 9, 1910.

Application filed January 7, 1908. Serial No. 409,686.

*To all whom it may concern:*

Be it known that I, LEWIS E. WATERMAN, a citizen of the United States, residing at Rockford, in the county of Winnebago and State of Illinois, have invented certain new and useful Improvements in Plows, of which the following is a specification.

The object of this invention is to construct a steam plow in which each plow has a pivotal connection with a supporting frame in order that the plow may be turned over so that access may be had to its under-face.

The further object of this invention is to hold the plow to its work by a friction slip connection.

In the accompanying drawings, Figure 1 is a perspective view of a plow and its connection with the frame, the plow in working position. Fig. 2 is a perspective view of the plow in its elevated position. Fig. 3 is a plan view of a wheeled plow to which my improvements are connected.

The frame 1 is this instance has its forward end supported by the front furrow wheel 17 and land wheel 18, each provided with suitable adjusting levers. The rear end of the frame is supported by the rear furrow wheel 19 and the land wheel 20, each provided with adjusting levers. By means of the adjusting levers the frame as a whole can be raised and lowered, and the plowing attachments to be described can be raised and lowered, or adjusted into the proper working position.

To the beam upper face of the frame 1 is adjustably connected a bracket 2 by the U bolts 3 embracing the beam and passing through openings in the bracket and receiving nuts 4 on their screw-threaded ends. This bracket has an arm 5 extending diagonally with relation to the frame and has its free end in hook form, the open end of the hook being uppermost. A set-screw 7 has a screw-threaded connection with the closed end of the hook 6 and projects into the opening of the hook. From the bracket 2 extends an ear 8. A plow-beam 9 has a brace 10 connected to it and extends forward at the same time separating from the beam. The free end of the brace 10 has a pivotal connection with the ear 8 by the bolt 11. The end 12 of the plow beam 9 has a pivotal connection with the arm 5 by the bolt 13. The bolts 11 and 13 are in line and located diagonally across the beam 1. A bolt 14 is connected to the plow beam 9 and positioned to enter the hook 6 when the plow is in working position, and a nut 15 turned on the bolt serves to clamp the beam in connection with the arm. A plow 16 is secured to the plow-beam.

Fig. 1 shows the plow in working position, and held in this position by the frictional connection through the bolt 14 and nut 15. Should the plow 16 strike an obstruction sufficiently to break the frictional connection between the beam 9 and arm 5, the plow will raise sufficiently to pass the obstruction and can afterward be returned to its working position. When it becomes necessary to place a new bottom on the plow, or to repair the plow, the plow can be turned into the position shown at Fig. 2 when ready access may be had to it.

In turning the plow into the position shown in Fig. 2, the plow beam 9 will rest in contact with bracket which will act as a stop. By locating the pivotal bolts 11 and 13 diagonal to the length of the frame 1 and over the same, the weight of the plow 16 when turned up will be over the frame. By means of the U bolt connection between the bracket 2 and the frame, the bracket with the plow attached can be adjusted lengthwise of the frame to properly place it with relation to the supporting wheels or other plows.

I claim as my invention.

1. The combination with a support, of an upwardly swinging plow beam pivotally connected at one end thereto and having a plowing member at its other end, and a friction slip connection between the support and the intermediate portion of the beam between its pivotal connection and the plowing member.

2. The combination with a support, of an upwardly swinging plow beam pivotally connected at one end thereto and having a plowing member at its other end, said support and the intermediate portion of the beam between its pivotal connection and the plowing member being provided, one with a slot and the other with a clamping device that is frictionally engaged in the slot.

3. The combination with a main frame, of a bracket associated with the main frame and offset at one side of the same, means for securing the bracket to the main frame, a plow beam movably mounted on the bracket independently of the main frame, and means connecting the bracket and beam independently of the main frame for normally holding the beam against movement, but permitting said movement under undue strain.

4. The combination with a main frame, of a bracket secured to the frame and having an outstanding arm, a plow beam pivoted at one end to the bracket, adjacent to the frame, and means connecting the arm and beam for normally preventing the pivotal movement of the latter.

5. The combination with a frame bar, of a bracket secured thereto and having an outstanding arm disposed diagonally to the frame bar, a beam pivoted to the bracket, and a holding connection between the arm and beam.

6. The combination with a main frame bar, of a bracket slidable longitudinally along the same, means for securing the bracket against movement to the bar, and at different points thereon, an upwardly swinging plow beam pivoted to the bracket, and a friction connection between the bracket and beam for normally holding the latter against its upward swinging movement.

7. The combination with a main frame bar disposed diagonally to the line of movement of the plow, of a bracket slidable along the main frame bar, means for securing the bracket against movement and in different positions on the bar, and a plow beam disposed longitudinally of the line of movement of the plow and pivoted at its front end to the bracket.

8. The combination with a main frame bar, of a bracket secured thereto, a beam pivoted at its front end to the bracket and carrying a plow at its rear end, and a brace secured to the beam and pivoted to the bracket in spaced relation to the beam with its axis of movement coincident therewith.

In testimony whereof I have hereunto set my hand in presence of two subscribing witnesses.

LEWIS E. WATERMAN.

Witnesses:
A. O. BEHEL,
E. D. E. N. BEHEL.